UNITED STATES PATENT OFFICE.

JOHN M. MYRICK, OF YOUNGSTOWN, OHIO.

INSECTICIDE OR COMPOUND FOR DESTROYING COTTON BOLL-WEEVIL.

1,313,724. Specification of Letters Patent. Patented Aug. 19, 1919.

No Drawing. Application filed February 18, 1919. Serial No. 277,720.

*To all whom it may concern:*

Be it known that I, JOHN M. MYRICK, a citizen of the United States, residing at Youngstown, in the county of Mahoning and State of Ohio, have invented certain new and useful Improvements in Insecticide or Compound for Destroying Cotton Boll-Weevil; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an insecticide, or compound for destroying the cotton boll-weevil. The invention has for its object to destroy or kill the boll-weevil which has committed such ravages in its attacks on the boll of the cotton plant in the cotton producing sections of the country. Much time and thought and efforts have been expended to find an effective means for checking the injury done by the attacks of this weevil, and from the results attained in the actual practice of the present invention, it is believed that it affords an effective relief or remedy from the evil complained of. The invention consists of a compound composed of the ingredients hereinafter specified and applied in the manner to be indicated. The compound is composed of alum, potash, (preferably carbonate of potash, or caustic potash), Paris green, red or Cayenne pepper, and "stick" licorice, in approximately given proportions, thoroughly mixed and dissolved, and the solution sprayed upon the cotton plant, particularly upon the cotton boll.

In preparing the compound there is used, to one gallon of water, the following ingredients, to wit, alum (one part, or by weight 95 grains); potash, (one part, or by weight 105 grains); Cayenne or red pepper (four parts, or by weight 170 grains); Paris green (four parts, or by weight 493 grains); and stick licorice, pulverized (one part, or by weight 65 grains). The ingredients are thoroughly mixed and then dissolved in the water, and after thoroughly dissolved may be diluted by the addition of three gallons of water, more or less, as conditions at the time may suggest or make desirable. The compound is applied by spraying to the plant and particularly to the cotton boll. By actual use of this compound in the manner specified it has been found to be most effective in the results obtained as upon examination of the boll-weevil after the treatment and observation of the crop of cotton produced, the results have shown the efficiency of the compound.

The licorice serves as a glutinous binder that causes the compound to adhere to the parts to which the compound is applied.

I have given the proportions of the ingredients found best in practising the invention but they may be varied provided that substantially the relative proportions between the Paris green and Cayenne pepper and the other ingredients named be used, without departing from the invention.

Having described my invention and set forth its merits what I claim is:

The insecticide or compound for treatment of the boll-weevil, composed of alum, potash, Cayenne pepper, Paris green, and a glutinous binder, in solution or suspension for use as a spray, the alum and potash being in smaller percentage than the Paris green and Cayenne pepper.

In testimony whereof I affix my signature in presence of two witnesses.

J. M. MYRICK.

Witnesses:
L. H. SCOTT,
S. C. HONESTY.